United States Patent [19]

James

[11] Patent Number: 5,377,537

[45] Date of Patent: Jan. 3, 1995

[54] SYSTEM AND METHOD TO COMPENSATE FOR TORSIONAL DISTURBANCES IN MEASURED CRANKSHAFT VELOCITIES FOR ENGINE MISFIRE DETECTION

[75] Inventor: John V. James, Walled Lake, Mich.

[73] Assignee: Ford Motor Company, Dearborn, Mich.

[21] Appl. No.: 114,231

[22] Filed: Sep. 1, 1993

[51] Int. Cl.⁶ .......................................... G01M 15/00
[52] U.S. Cl. ................................................. 73/117.3
[58] Field of Search ............... 73/116, 117.3; 324/167, 324/173, 174; 364/431.07; 123/419, 436

[56] References Cited

U.S. PATENT DOCUMENTS

| | | |
|---|---|---|
| 4,843,870 | 7/1989 | Citron et al. |
| 5,007,007 | 4/1991 | van Zanten et al. |
| 5,095,742 | 3/1992 | James et al. |
| 5,117,681 | 6/1992 | Dosdall et al. |
| 5,119,783 | 6/1992 | Komurasaki |

*Primary Examiner*—Robert Raevis
*Attorney, Agent, or Firm*—Mark Mollon; Roger L. May

[57] ABSTRACT

A system and method compensates for systematic irregularities in measured engine velocities caused by torsional flexing in the crankshaft during rotation to improve the accuracy of misfire detection. The present invention compensates for irregularities in "Profile-Ignition-Pick-Up interval" (PIP interval) timing. These irregularities are systematic with respect to different engine cylinders. The present invention is configured to function with a processor unit. Correction factors for each of the n PIP intervals of an engine cycle are generated for each of a multitude of engine operating conditions, where n is the number of cylinders in the engine. Each set of n generated correction factor is stored in a table (a "look-up table" located in a memory unit) having a corresponding unique address location. This table is typically determined empirically in the calibration of the engine type by a test engine. The correction factors are generated while the test engine is rotated at a fixed steady state operating point with combustion, where the operating point is typically a particular speed and load.

18 Claims, 6 Drawing Sheets

SYSTEM AND METHOD TO COMPENSATE FOR TORSIONAL DISTURBANCES IN MEASURED CRANKSHAFT VELOCITIES FOR ENGINE MISFIRE DETECTION

BACKGROUND OF THE INVENTION

1. Field of the Invention

The present invention relates generally to misfire detection in internal combustion engines, and more specifically to a system and method that adjusts for systematic irregularities in measured engine velocities caused by torsional flexing of the crankshaft during rotation.

2. Related Art

One way to detect misfires in internal combustion engines is to measure crankshaft speed and observe fluctuations in speed. Detection of deviations in crankshaft velocities (as manifested by abnormal acceleration values) from expected normal crankshaft velocities is an indication of misfire. Deviations in acceleration are determined over nominally equal successive intervals of crankshaft rotation, referred to as "Profile-Ignition-Pick-Up intervals" (PIP intervals). A PIP signal is a digital signal received from a sensor, which detects specified positions of rotation of a crankshaft mounted wheel during engine rotation. PIP intervals are also known as combustion intervals, which are equal in length (but not necessarily phase) to the angular rotation between top dead centers of adjacent cylinders in the firing order.

Ideally, during normal operation, an engine will produce a series of PIP transition signals whose periods indicate the average crankshaft velocity during a substantial portion of the power stroke for each of the cylinders in the engine. The crankshaft velocity will either remain constant (zero acceleration), increase (positive acceleration) or decrease (negative acceleration) depending on whether the engine is operating at steady state, accelerating or decelerating, respectively. For example, if a normal engine is operating under steady-state operation (no acceleration), then it is expected to produce an acceleration value of near zero over successive PIP intervals. However, if a particular cylinder in an engine produces a sufficiently negative value during steady-state operation, then this occurrence will be interpreted as a misfire condition, since a zero value is expected as an output for all cylinders in a normal engine during steady state operation.

Accordingly, misfire detectors in general look for individual cylinders yielding acceleration values different from the local norm of all cylinders, where the local norm depends upon the operating condition (i.e., steady state, acceleration, or deceleration, etc.). The problem is that individual cylinders in normal engines tend to yield values of velocity, which differ slightly from the local norm of all cylinders in a systematic manner according to cylinder number. In a normally operating engine, this will interfere with the misfire detection system's ability to detect abnormal behavior due to misfire.

There are at least two sources of such cylinder-specific-irregularities. The first is discussed in Dosdall et al. U.S. Pat. No. 5,117,681, incorporated herein by reference. Dosdall et al. deals with systematic irregularity arising from PIP spacing of the wheel. If the wheel which serves as the position encoder on the crankshaft is even slightly irregular in PIP-interval spacing (e.g., a few tenths of a degree difference), then a normal engine operating at constant true PIP-to-PIP velocity (steady state) will appear to be experiencing subtle velocity changes (hence, non-zero acceleration values). The velocity changes will appear to coincide with the particular cylinders associated with the irregular PIP intervals. Although the degree of impact that a given wheel error has on the acceleration calculation is strongly rpm-dependent, the error itself is fixed, and so it can be empirically determined at any operating condition, even deceleration.

Dosdall et al. prefer to employ defueled coast down when sensing encoder errors. The reason is to avoid uneven acceleration during data collection, since with no fuel, all cylinders are unpowered. Application of the process specified in Dosdall et al. to coast down data yields a set of values which indicates the actual PIP-interval spacings of the wheel relative to the nominal values (i.e., assumed equal spacing). There are only n/2 unique correction values derived in this manner, since crankshaft mounted wheels typically have half as many PIP-intervals as engine cylinders (n). Each individual correction value is used twice per engine cycle.

The second problem, subject of the present invention, is that even under normal operation conditions the crankshaft will produce different amounts of speed-up and slow-down because of the non-rigid (torsional) behavior of the crankshaft. Since the crankshaft is not rigid, it produces subtle oscillations (due to crankshaft flexing) in the PIP signal (systematic "noise"). This noise tends to camouflage true misfires and can cause an erroneous indication of one or more cylinders as having misfired even when engine operation is in fact normal. For example, cylinders at the front of a crankshaft might affect the speed of the crankshaft at the measuring point slightly differently than cylinders at the rear. The effects of crankshaft-torsional-flexing can occur when the power is cut-off (as in the Dosdall et al. patent), because inertial torques produce uneven motions (acceleration). In general, the effects of such torsional variations on the calculated acceleration values are most pronounced at higher engine speeds as manifested in typical engine data.

There is no prior technique able to adequately solve the foregoing problems consistent with PIP interval data collections used in misfire detection schemes. Therefore, what is needed is a mechanism that compensates for torsional effects in crankshaft speed calculations to enable accurate misfire detection.

SUMMARY OF THE INVENTION

The present invention is directed to a system and method that compensates for systematic irregularities in measured engine velocities caused by torsional flexing in the crankshaft during rotation. The measured engine velocities are used for detecting engine misfire in an internal combustion engine. As a result misfire detection accuracy is significantly improved.

The present invention compensates for irregularities in "Profile-Ignition-Pick-Up interval" (PIP interval) timing which are systematic with respect to different engine cylinders (i.e., irregularities in PIP timing caused by torsional flexing of the crankshaft is an inherently regular occurrence in normal engines). The present invention is configured to function with a processor unit. In the preferred embodiment, correction factors for each of the n PIP intervals of an engine cycle are generated for each of a multitude of engine operating conditions. Each set of n generated correction factors is stored in a table (a "look-up table" located in a memory unit) and has a corresponding unique address location. This table is typically determined empirically in the calibration of the engine type by a test engine. The correction factors are generated while the test engine is rotated at a fixed steady state operating point with combustion, where the operating point is typically a particular speed and load.

The table can then be loaded in memory units of production vehicles. During operation, measured operational parameters from the engine (e.g., a particular speed and load) are used as an address to retrieve correction factors stored in the look-up table. Interpolation is used to retrieve correction factors from the look-up table that do not match an exact address location provided by the measured operational parameters. The correction factors are then applied to a general velocity formula for misfire detection as the production engine functions in real-time in conjunction with a processor.

Accordingly, the present invention improves the ability of misfire detection systems to distinguish normal operation firings from misfires.

Further features and advantages of the present invention, as well as the structure and operation of various embodiments of the present invention, are described in detail below with reference to the accompanying drawings.

DETAILED DESCRIPTION OF THE PREFERRED EMBODIMENTS

The present invention employs similar sensing apparatus as those used in Dosdall et al. U.S. Pat. No. 5,117,681, incorporated herein by reference. A brief overview of these sensing devices is provided below.

Figure 1:
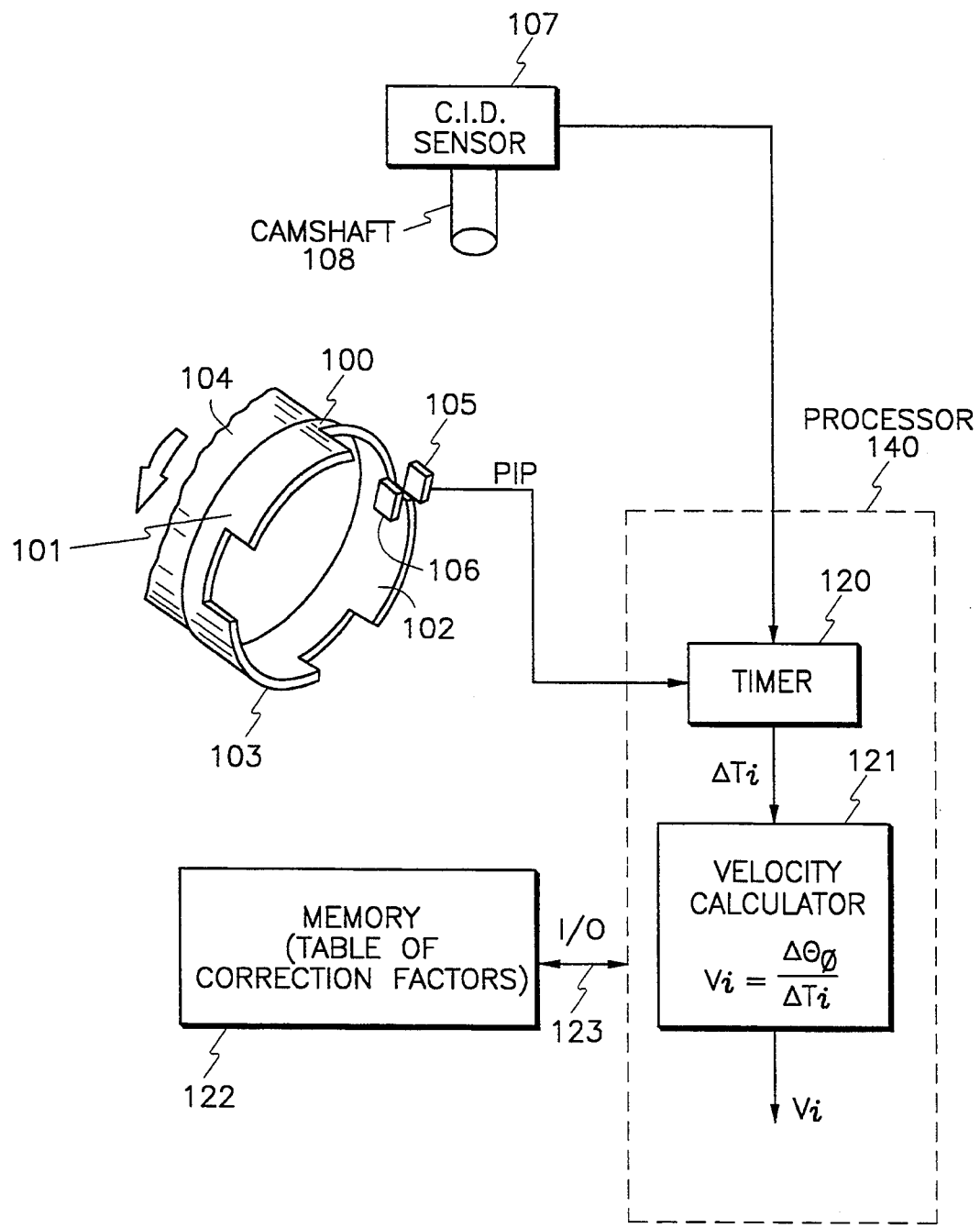
FIG. 1 illustrates an example position sensing and velocity measuring system employed by the present invention.

FIG. 1 illustrates an example position sensing and velocity measuring system employed by the present invention. The engine rotation position sensing system of FIG. 1 includes a rotor 100 including vanes 101, 102, and 103 which rotate with a crankshaft 104 (a three-vane rotor from a 6-cylinder engine is shown in this example). The vanes 101–103 pass between a hall-effect sensor 105 and a permanent magnet 106 to generate a profile ignition pulse (PIP) signal 109 as the crankshaft 104 rotates. Vanes 101–103 are typically arranged to generate a rising edge in the PIP signal 10° before top dead center (in the preferred embodiment, falling edges 60° before and 60° after top dead center for a six cylinder engine) of each respective cylinder. The rising edge in the PIP signal actually indicates the approach to top dead center of two engine cylinders, one of which is approaching a power stroke and one of which is approaching an intake stroke since it takes two full crankshaft rotations to complete an engine cycle.

A cylinder identification (CID) sensor 107 is connected to a camshaft 108 for identifying which of the two cylinders is actually on its power stroke. Since camshaft 108 rotates once for every two rotations of crankshaft 104, a CID signal is preferably generated having a rising edge corresponding to the power stroke of cylinder No. 1.

A timer 120 receives the PIP signal and the CID signal and measures elapsed time between predetermined engine position locations as determined by the CID and PIP signals (preferably between falling edges of PIP). The elapsed time $\Delta T_i$ for each velocity measuring interval is output from timer 120 to a velocity calculator 121 where the assumed angular spacing $\Delta \Theta_0$ is divided by time $\Delta T_i$ to provide the velocity value $V_i$.

In the preferred embodiment, timer 120 and velocity calculator 121 are parts of firm/software in a processor system ("Processor") 140. Timer 120 and velocity calculator may also be implemented as hardware. A memory device 122 is coupled to processor 140 via a bi-directional bus 123.

Figure 2:
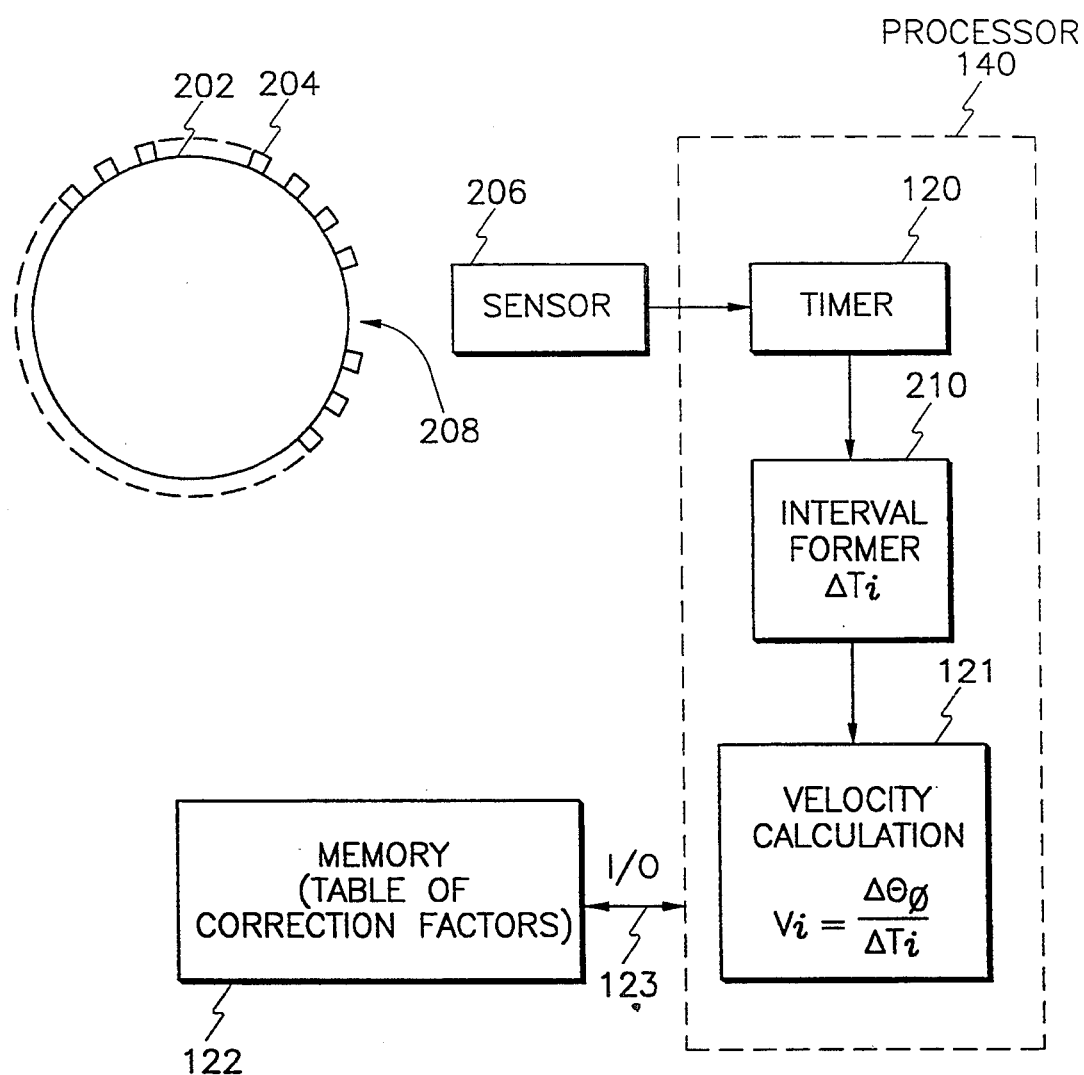
FIG. 2 illustrates an alternative embodiment of a position sensing and velocity measuring system employed by the present invention.

An alternative embodiment of position sensing apparatus is shown in FIG. 2. A multi-toothed wheel 202 is mounted on an engine for rotation with the crankshaft. A plurality of teeth 204 are disposed along the periphery of wheel 202 at a predetermined angular spacing. A sensor 206 is disposed in a fixed location closely spaced to teeth 204 for sensing when each tooth passes sensor 206.

In the preferred embodiment, a missing tooth location 208 is provided on wheel 202 to establish an absolute location reference, e.g., at 90° before top dead center of cylinder No. 1.

Sensor 206 is connected to timer 120 and velocity calculator 121 as described with reference to FIG. 1. However, since the velocity measuring intervals in this embodiment are longer than the spacing of teeth 204, an interval former 210 is disposed between timer 120 and velocity calculator 121 in order to provide the sum of the measured time periods for the consecutive teeth which are included in the particular velocity interval to be measured. As shown in FIGS. 1 and 2, timer 120, and velocity calculator 121 and interval former 210 may preferably be implemented in the programmed processor 140.

Figure 3:
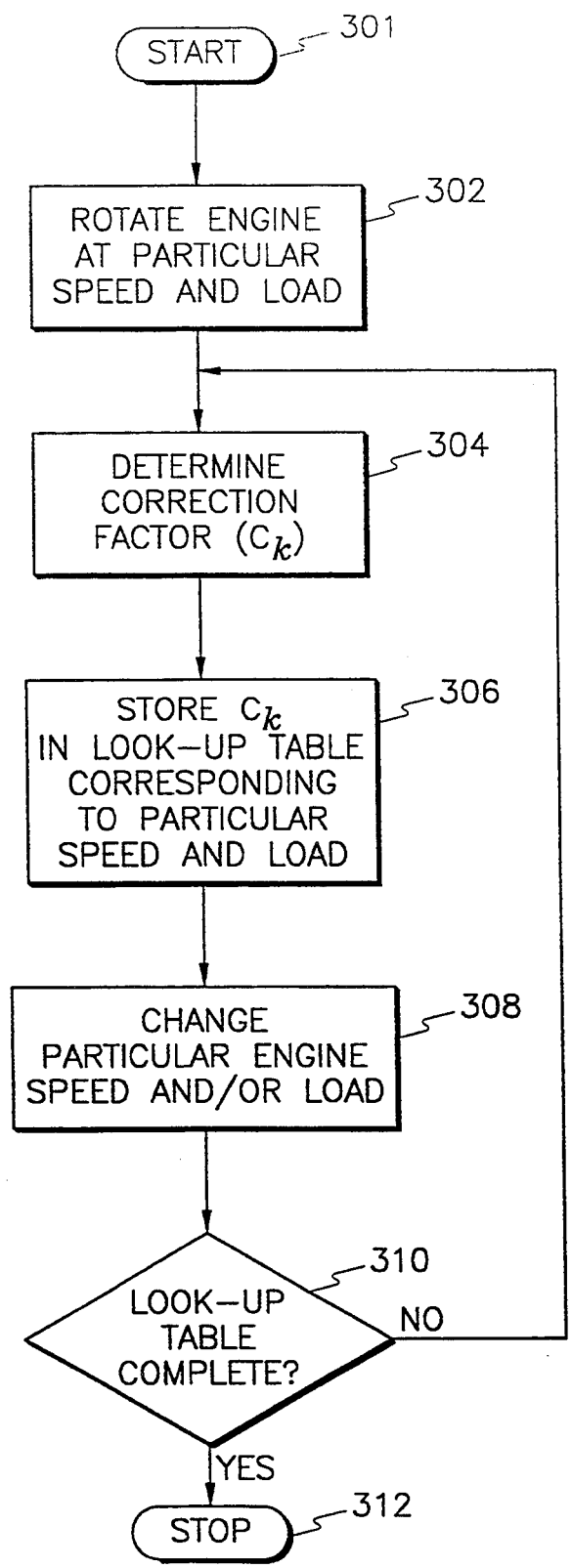
FIG. 3 is a flow chart illustrating the procedural steps used by a processor to obtain correction factors ($C_k$), according to the present invention.

According to the present invention, compensations (correction factors) are made for systematic irregularities arising from true velocity fluctuations of crankshaft mounted wheels 100, 202 due to the dynamics of the individual cylinders producing torque at differing locations on a flexible crankshaft 104. FIG. 3 is a flow chart illustrating the procedural steps used by processor 140 to obtain correction factors ($C_k$).

Referring to FIG. 3, in step 302 the engine is rotated at a fixed steady state condition. "Steady state" means that the engine is rotated at a particular speed and load during powered operating conditions, where speed is in Revolutions-Per-Minute (RPM) and load is a percentage of full air charge, which is nominally proportional to torque. For example, it may first be desired to measure the response of the engine at 2000 RPM with a load of 0.50 (where the load is measured as a scale from 0-to-1 of the maximum air charge that the engine is capable of taking-in to create torque). The number of load and speed points selected for generating the look-up table is dependent upon accuracy required of the system and the engine being characterized. Speed and load are the two most important factors that effect torsional effects in the crankshaft 104. However, it is contemplated to employ operational parameters other than speed and load (e.g., spark advance and Exhaust Gas Recirculation (EGR)), which are typically found to effect engine torque, and hence, the degree of torsional flexing of the crankshaft 104.

In step 304, a unique set of correction factors, one for each cylinder, is determined for each unique steady state operating point (particular speed and load) from data collected over N complete cycles of a normally operating engine. These correction factors are denoted $C_k$: where k=1 to n, and where n is the number of cylinders in the engine. For purposes of implementation, it is convenient to number cylinders by their position in the engine firing sequence, rather than by cylinder number designation. Thus, $C_1$ is the correction factor at a given operating condition for cylinder 1, $C_2$ is the corresponding factor for the next cylinder in firing order, and so forth.

Figure 4A:
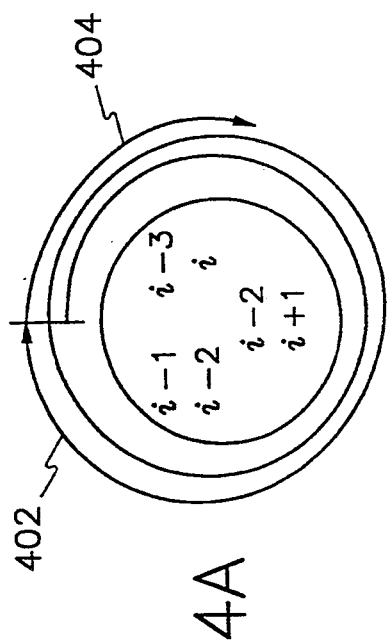
FIG. 4A graphically depicts two revolutions of a position encoder during one complete cycle of an example six-cylinder engine, according to the present invention.

The correction factor for the $k^{th}$ cylinder is based on the average ratio of each PIP-interval velocity (denoted $V_i$) associated with cylinder k, to the average velocity (denoted $W_i$) over an entire engine cycle substantially centered on the PIP interval. This relationship is graphically depicted in FIG. 4A, which represents two revolutions of a position encoder during one complete cycle 402 of an example six-cylinder engine (where a PIP interval is denoted 404). The six measurement intervals are designated i−3, i−2, i−1,i,i+1,i+2, where a single estimate of the correction factor for interval i is to be determined. The two velocities calculated for each i are the average velocity ($V_i$) over the PIP interval 404 (length 120°) and the average velocity ($W_i$) over the entire engine cycle 402 (length 720° or calculated over a plurality of engine cycles 402).

Figure 4B:
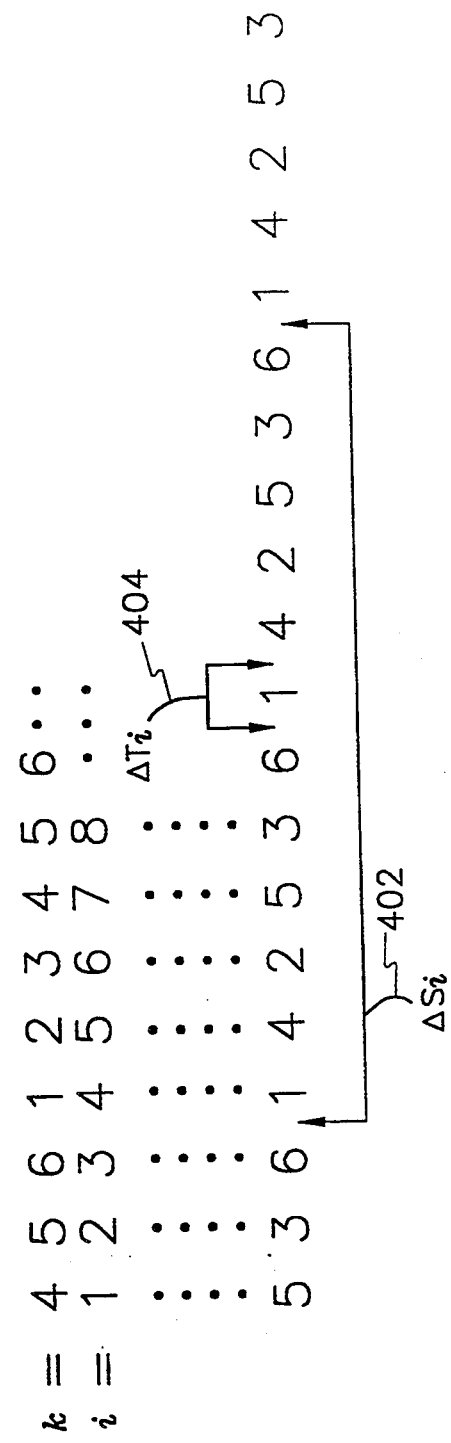
FIG. 4B illustrates PIP intervals arranged linearly along a time line over an entire engine cycle as shown in FIG. 4A.

These intervals are also illustrated in FIG. 4B, showing the PIP intervals 404 arranged linearly along a time line. The ratio of $W_i$ over $V_i$ during steady-state operation is a measure of the correction factor for the particular cylinder during the $i^{th}$ interval. This measurement must be repeated for many subsequent intervals at the same operating condition, in order to provide repeated measurements of the correction factors for each of the PIP intervals comprising an engine cycle 402. As shown in FIG. 4B, each PIP interval 404 can be measured by its corresponding change in time $\Delta t_i$ and each entire engine cycle 402 can be measured by its change in time denoted $\Delta s_i$.

Averaging the results separately for each of n cylinders is performed for data collected over N-cycles according to equation (1.0) to obtain the correction factors:

$$C_k = \frac{1}{N} \sum_{i \in S_k} \frac{W_i}{V_i} \qquad \text{(eq. 1.0)}$$

where the restriction of i values in the summation to elements of set $S_k$ merely indicates the intervals which are associated with cylinder k. For example, a data set which begins with cylinder 1 would yield a set $S_1 =: i = 1, 7, 13, 19, \ldots$, for a six-cylinder engine. The i values for calculating correction factor $C_2$ would be the set $S_2 =: i = 2, 8, 14, 20 \ldots$, and so forth. It should be noted that $$W_i = \frac{720°}{\Delta s_i} \text{ and } V_i = \frac{\Delta \theta_0}{\Delta t_i}, \text{ where } \theta_0 = \frac{720°}{n}.$$

Substituting these expressions into equation (1.0) yields an alternate but equivalent equation for $C_k$ as shown in equation (1.1):

$$C_k = \frac{n}{N} \sum_{i \in S_k} \frac{\Delta t_i}{\Delta s_i} \qquad \text{(eq. 1.1)}$$

Next, in step 306, processor 140 stores correction factors obtained in step 304, in memory 122 as part of a "table of correction factors" also referred to as the "look-up table." The correction factor for each $C_k$ (where k=1-to-n) is written into memory 122 at an address which corresponds to the particular speed and load that the engine is operating. Memory 122 is preferably implemented using random-access memory (RAM), but may be any type of memory used with processors such as DRAM, SRAM, etc.

In step 308, an operational parameter (such as speed and/or load), which effects crankshaft torque, is modified to obtain additional correction factors. Steps 304, 306 and 308 are then repeated until the look-up table is complete, which is shown as the "YES" path of decisional step 310. Typically, the more correction factors that are generated and stored in memory 122, the more accurate will be the resulting system.

Once these correction factors are determined for each of a multitude of engine operating conditions, an adjustment to the correction factors stored in memory 122 is necessary to remove the contribution attributable to irregularities in the wheel interval spacings on the encoder wheel 100, 202 of the test engine as described in the Dosdall et al. patent. Thus, each of the correction values in the table must be divided by the appropriate wheel correction faction as described in the Dosdall et al. patent. The reason that the effect of wheel irregularity on the correction factors must be removed is to ensure that only the effects of torsional fluctuations of the crankshaft remain in the table of correction factors 122. This is necessary since the subtle irregularities in encoder wheels 100, 202 may vary from instance-to-instance in production, and can in fact be determined on an individual engine basis by a single coast-down test described in the Dosdall et al. patent.

In contrast, the pattern of torsional fluctuation at each speed and load is mostly a function of the engine design, and can be characterized in a table of correction factors in memory 122 having calibrated correction values. For adjustments to the torsional correction table in memory 122 to be attempted dynamically on each individual engine in the above manner would require a priori knowledge that data was being gathered from a normally operating (non-misfiring) engine, which is a difficult assumption to make under uncontrolled field conditions. And since the misfire detection process relies on these correction factors to assure more accurate misfire detection at higher engine speeds, reliance on such a misfire detection process to ensure normal operation during data collection would not be supported.

Thus, the table of correction factors 122 is determined empirically in the calibration of the engine type by a test engine (or through simulation, if sufficiently sophisticated). Once the look-up table in memory 122 is complete, it can be implemented in production vehicles. This look-up table of memory 122 allows corrections factors $C_k$ to be determined for each engine operating condition. For instance, if the engine were operating at 2000 RPM at a load of 0.25, these two operating parameters would be used as an index (or address) (via bus 123 shown in FIGS. 1 and 2) to the look-up table of memory 122 (the load input to bus 123 is not shown in FIGS. 1 and 2). The output, via bus 123, of the look-up table would be the correction factors $C_k$ corresponding to the operating conditions of 2000 RPM at a load of 0.25. Interpolation can be used to estimate each of n correction factors from the nearest adjacent points in the look-up table of memory 122, if the operational parameters do not exactly match the indexed value in the look-up table of memory 122.

Figure 5:
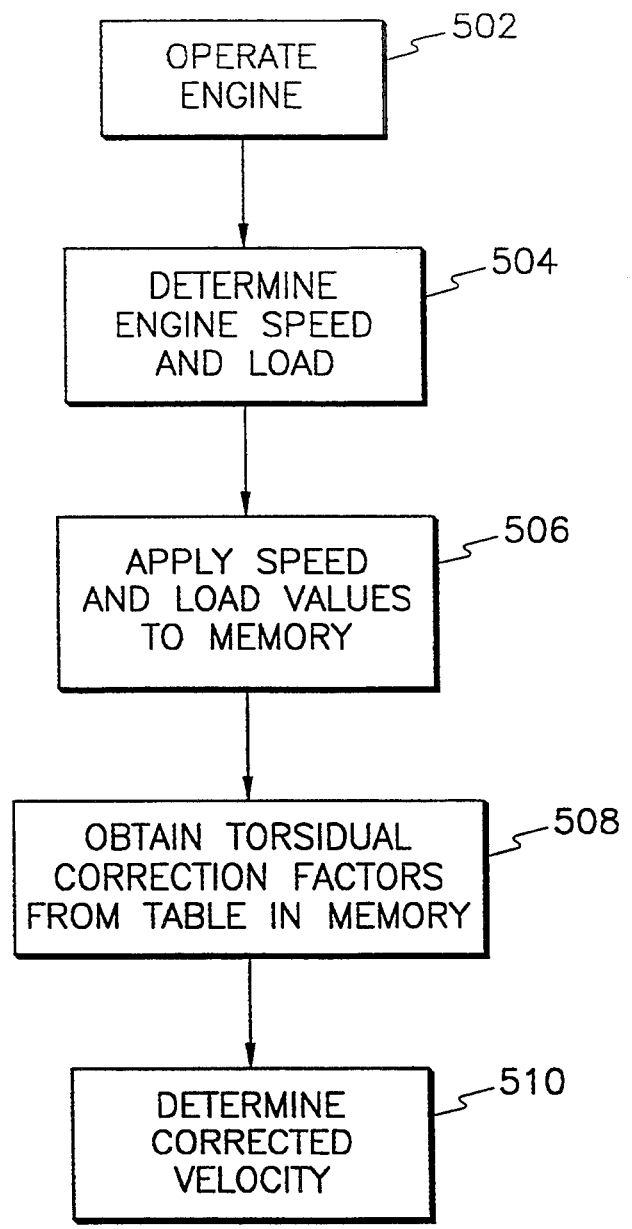
FIG. 5 is a flow chart illustrating how the torsional correction factors are deployed in a production vehicle having an internal combustion engine.

Deployed in production vehicles, the table of torsional correction factors are utilized in conjunction with the set of correction factors for the wheel to obtain corrected velocity measurements $V'_i$ of an engine. FIG. 5 is a flow chart illustrating how the torsional correction factors are deployed in a production vehicle having an internal combustion engine.

Referring to FIG. 5, in step 502, the engine is rotated at a particular speed and load according to driving conditions typically encountered by a production vehicle in day-to-day rise. In step 504, each new speed and load of the engine is measured as described above. In step 506, the speed and load values are employed as an input to memory 122 via bus 123 to retrieve a corresponding correction factor(s) from memory 122. It is not necessary to retrieve new correction factors every PIP interval, however, the system is generally more accurate if the correction factors are updated in a timely fashion. In step 508, the on-board computer (processor 140) calculates the set of n torsional correction factors appropriate for that operating condition by performing a two-dimensional interpolation of the values in the table of correction factors to the nearest operating point (referred to as $C_k^*$, k=1 to n, where * implies the interpolated results from the table).

Then, in step 510, the correction factor $C_k^*$ obtained in step 508 from memory 122 is employed by the processor 140 to obtain the corrected velocity $V_i$. Equation (1.2) shows one possible expression to calculate the corrected velocity:

$$V'_i = C_k^* B_k V_i \qquad \text{(eq. 1.2)}$$

where: $V_i$ is the uncorrected velocity for the $i^{th}$ interval, $B_k$ is the wheel profile correction factor (as described in the Dosdall et al. patent), and $C_k^*$ is the current value of the torsional correction factor, and k is the cylinder number associated with the $i^{th}$ interval. Many alternative functions can be devised to obtain the corrected velocity. For example, after the wheel correction factors $B_k$ are determined in a particular engine, a new table of values $C_k' = C_k B_k$ can be formed and used in place of the table of $C_k$, thus combining these two correction factors into one table, thereby eliminating one extra multiplication at each subsequent velocity determination.

Likewise, other mathematical variants can be employed to derive correction factors from engine data. For example, an alternative method of deriving the $C_k$ is to perform a least squares fit of the corrected PIP-interval velocities to the cycle-average velocities. In other words, choose the $C_k$ so as to minimize an error defined in equation (1.3) as:

$$E = \sum_{i \in S_k} (V'_i - W_i)^2 = \sum_{i \in S_k} (C_k V_i - W_i)^2 \qquad \text{(eq. 1.3)}$$

Well known techniques for setting $$\frac{\partial E}{\partial C_k}$$

equal to zero yield the alternative formula for $C_k$ as follows in equation 1.4:

$$C_k = \frac{1}{N} \frac{\sum_{i \in S_k} W_i V_i}{\sum_{i \in S_k} V_i^2} \qquad \text{(eq. 1.4)}$$

In fact, it can be shown that equation (1.0) is equivalent to a least squares fit of the relative velocity differences, with the error defined by equation 1.5:

$$E = \sum_{i \in S_k} \left( \frac{V'_i - W_i}{V_i} \right)^2 \qquad \text{(eq. 1.5)}$$

Figure 6A:
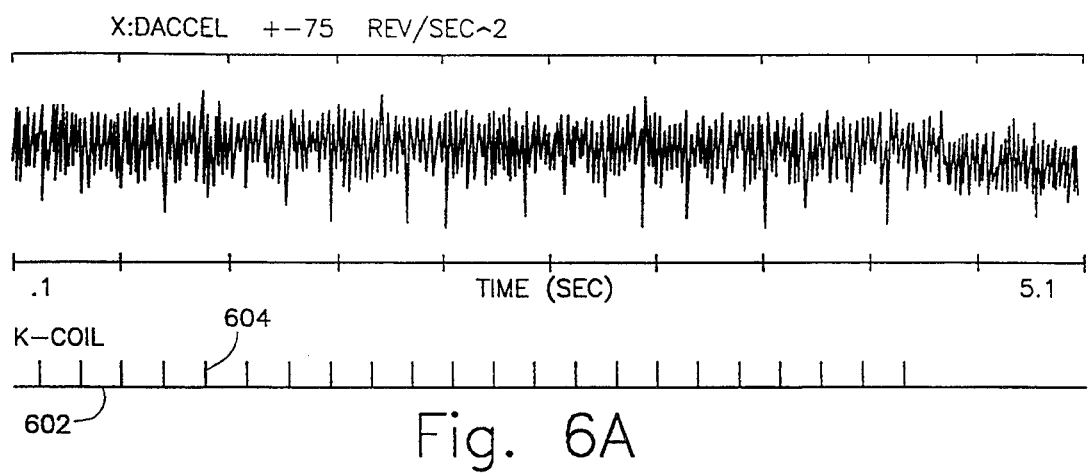
FIG. 6A shows a misfire detection signal calculated without any type of correction to the velocities.

Applying the methodology of the present invention yields an effective system for removing systematic irregularities caused by torsional flexing in the crankshaft 104. The effectiveness of the present invention is illustrated by the example depicted in FIGS. 6A–6C, which show traces of Deviation Acceleration (DACCEL) determined from the PIP interval times of a six-cylinder engine operating at about 4000 rpm at light load. DACCEL is a fundamental detection parameter (sometimes referred to as "accel. deviation") (described in U.S. Pat. Nos. 5,095,742 to James et al. 5,044,194 to James et al., 5,044,195 to James et al. and 5,109,645 to James et al.) closely related to the acceleration of the crankshaft as manifest by changes in the PIP-interval velocities FIG. 6A shows DACCEL calculated without any type of correction to $V_i$. The regular occurrences of misfire induced throughout the file are only marginally visible above the noise at this engine speed and load. Occurrences of misfire may be determined frown the K-COIL signal 602 (shown below the DACCEL trace in FIGS. 6A–6C), which records instances of intentional misfire creation (shown as a vertical spike 604).

Figure 6B:
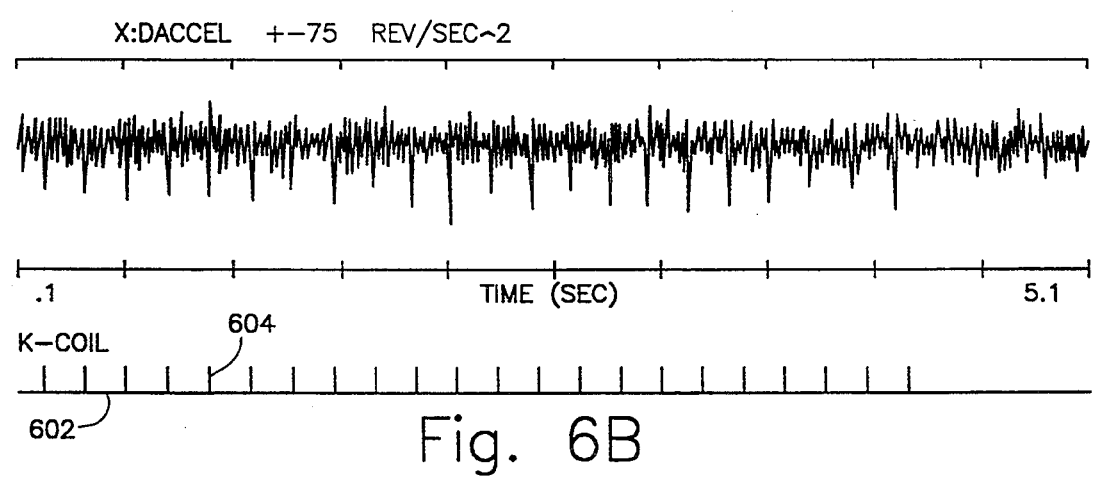
FIG. 6B shows the same misfire detection signal of FIG. 6A with some improvement in the signal-to-noise ratio after applying wheel-profile correction factors to the velocities.
Figure 6C:
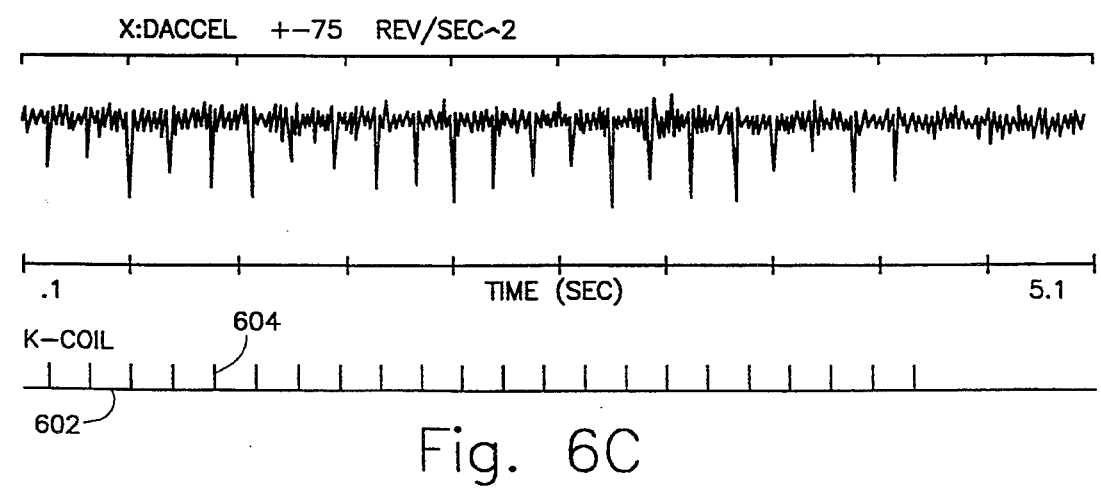
FIG. 6C shows the same misfire detection signal of FIGS. 6A–6B, but applying correction factors to compensate for torsional fluctuations according to the present invention, which provides much greater improvement resulting in the more distinguishable misfire signal.

FIG. 6B shows some improvement in the signal-to-noise ratio over the same points after applying wheel-profile correction factors to the velocities, as described in the Dosdall et al. patent. Correction for profile errors yields only a modest improvement in signal quality in this case, because the wheel on the engine used to generate this data was fairly accurate. However, applying correction factors to compensate for torsional fluctuations as described above provides much greater improvement, resulting in the more distinguishable misfire signal as shown in FIG. 6C according to the present invention.

Tests at other speed and load points yield similar improvements, but with slightly different correction parameters on account of the differing torsional effects. As explained above, a look-up table in memory 122 can be created to allow interpolation of the proper correction at each speed and load point, while the engine rotates.

Alternative forms of compensation for wheel irregularities or torsional effects exist which can be shown to be mathematically equivalent to the multiplicative corrections explained above. For instance, acceleration values calculated from uncorrected velocities can be modified by additive corrections, $D_k$ as in equation (2.0):

$$A_i = A_i + D_k \qquad (eq.\ 2.0)$$

where, to a very good approximation, these corrections are related to the multiplicative correction factors $C_k$ according to equation (2.1):

$$D_k = \frac{V_i^2}{\Delta\theta_0} (C_{k \neq 1} - C_k) \qquad (eq.\ 2.1)$$

where the $\Delta\theta_0$ is the angular spacing between points on the encoder wheel. Even though these corrections to acceleration are additive, not multiplicative, equation (2.1) shows that the $D_k$ values have a strong dependence on engine speed, through the term $V_i^2$, even if factors $C_k$ are independent of speed (as in the case of wheel profile correction). As a result, it is preferred to apply correction in the calculation of velocity instead of acceleration. However, either method will accomplish the task of correction for effects which diminish the signal quality of misfire detection by crankshaft speed fluctuations.

While preferred embodiments of the invention have been shown and described herein, it will be understood that such embodiments are provided by way of example only. Numerous variations, changes, and substitutions will occur to those skilled in the an without departing from the spirit of the invention. Accordingly, it is intended that the appended claims cover all such variations as fall within the spirit and scope of the invention.

What is claimed is:

1. A method for generating a set of correction factors corresponding to individual rotation intervals between respective predetermined points disposed on an encoder wheel driven by an internal combustion engine to compensate for torsional effects in crankshaft speed, comprising the steps of:
   (a) detecting passage of said predetermined points past a fixed location to provide a position signal at each point;
   (b) causing said engine to rotate at a fixed steady state operating point with combustion;
   (c) measuring a time which elapses between each consecutive pair of said position signals occurring within N complete engine cycles, wherein N is a predetermined integer greater than zero;
   (d) calculating a velocity over said time between each pair of said position signals;
   (e) selecting a rotation interval between two of said predetermined points;
   (f) determining a total elapsed time for at least a 720° rotation of said encoder wheel including said selected rotation interval;
   (g) calculating an average velocity over said total elapsed time; and
   (h) determining a ratio of said velocity and said average velocity to obtain a correction factor.

2. The method of claim 1, wherein said correction factor is stored in a memory unit.

3. The method of claim 1, further comprising the steps of:
   (i) selecting a rotation interval corresponding to a pair of predetermined points occurring one engine cycle after said rotation interval of step (e); and
   (j) repeating steps (f) through (h).

4. The method of claim 3, further comprising the steps of:
   (k) repeating steps (i) and (j) for N times;
   (l) averaging the correction factors to obtain an average value of N correction factors corresponding to a particular cylinder k of said engine, wherein k is an integer value from 1 to n, and wherein n is the number of cylinders in the engine: and
   (m) storing said average value in a memory unit.

5. The method of claim 4, further comprising the steps of:
   (n) repeating steps (e) through (k);
   (o) averaging the correction factors to obtain a new average value of N correction factors corresponding to a new cylinder k from said engine; and
   (p) storing said new average value in a memory unit.

6. The method of claim 1, wherein said fixed steady state operating point is a particular speed and load of said engine rotating step.

7. The method of claim 1, wherein said fixed steady state operating point is a spark advance of said engine.

8. The method of claim 1, wherein said fixed steady state operating point is an Exhaust Gas Recirculation of said engine.

9. The ,method of claim 1, wherein said method is performed on a computer-generated model that simulates operating behavior of said engine.

10. A method for generating a correction factor to compensate for systematic irregularities in measured engine velocities of an internal combustion engine caused by torsional flexing in the crankshaft during rotation, the method comprising the steps of:
   operating the engine at a particular speed and load under powered operating conditions;
   detecting rotation of the crankshaft with a position encoder, said encoder producing a position signal indicative of the position of said crankshaft;
   measuring a first time interval for a first power stroke of a selected cylinder;
   calculating a first average crankshaft velocity over said first time interval from said position signal:
   measuring a second time interval for one engine cycle;
   calculating a second average crankshaft velocity over said second time interval; and determining a ratio of said first average velocity and said second average velocity to obtain a correction factor.

11. The method of claim 10, wherein said engine has a plurality of engine cylinders and said complete engine cycle is equal to a 720° rotation of said crankshaft.

12. The method of claim 10, wherein said correction factor is stored in a memory device.

13. The method of claim 10, wherein said method is performed on a computer-generated model that simulates operating behavior of said engine.

14. In a production vehicle having an internal combustion engine with a plurality of cylinders, said production vehicle also having a look-up table in a memory device coupled to a processor, the look-up table having a plurality of torsional correction factors, which were generated off-line and stored in the memory device, as well as a wheel profile correction factor, a method to compensate, during operation of the internal combustion engine, for torsional disturbances in measured crankshaft velocities to obtain a corrected crankshaft velocity, said method comprising the steps of:

rotating the engine at a particular speed and load;
measuring the speed and load of the engine;
retrieving the torsional correction factor from the look-up table corresponding to the particular speed and load;
retrieving the wheel profile correction factor from the look-up table corresponding to the particular internal combustion engine for which it was generated; and
calculating the corrected velocity of the engine by utilizing said torsional correction factor and said wheel profile correction factor.

15. The method of claim 14, wherein said step of retrieving said torsional correction factor from the look-up table comprises the step of performing multi-dimensional interpolations to obtain the correction factor corresponding to the measured speed and load.

16. The method of claim 14, wherein said step of calculating the corrected velocity of the engine involves applying the following formula:

$$V'_i = C_k^* B_k V_i$$

where: $V_i$ is the uncorrected velocity for the $i^{th}$ interval of a particular cylinder firing, $B_k$ is the wheel profile correction factor, and $C_k^*$ is the current value of the torsional correction factor obtained from the look-up table, and k is the cylinder number associated with the $i^{th}$ interval.

17. In a production vehicle having an internal combustion engine with a plurality of cylinders, said production vehicle also having a look-up table in a memory device coupled to a processor, said look-up table having a plurality of torsional as well as wheel profile correction factors, which were generated off-line and stored in the memory device, a method to compensate, during operation of the internal combustion engine, for torsional disturbances in measured crankshaft velocities to obtain a corrected crankshaft velocity, said method comprising the steps of:

rotating the engine at a particular speed and load;
measuring the speed and load of the engine;
retrieving correction factor from the look-up table corresponding to the particular speed and load; and
calculating the corrected velocity of the engine by utilizing said correction factors.

18. The method of claim 17, wherein said step of retrieving said torsional correction factor from the look-up table comprises the step of performing a multi-dimensional interpolations to obtain a nearest correction factor corresponding with a measured operating condition that effects torsional flexing via said measured operating condition's impact on engine torque.

* * * * *